United States Patent
Roy

(10) Patent No.: US 10,774,697 B1
(45) Date of Patent: Sep. 15, 2020

(54) ELECTRIC MOTOR, FOR AN ELECTRIC CAMSHAFT PHASER ASSEMBLY, INCLUDING END STOP FUNCTIONALITY AND METHOD THEREOF

(71) Applicant: Schaeffler Technologies AG & Co. KG, Herzogenaurach (DE)

(72) Inventor: Ayushmoy Roy, Bangalore (IN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/398,544

(22) Filed: Apr. 30, 2019

(51) Int. Cl.
| | | |
|---|---|---|
| *F01L 1/34* | (2006.01) | |
| *F01L 9/04* | (2006.01) | |
| *F01L 1/344* | (2006.01) | |
| *F16D 1/12* | (2006.01) | |
| *F01L 1/352* | (2006.01) | |

(52) U.S. Cl.
CPC .............. *F01L 9/04* (2013.01); *F01L 1/344* (2013.01); *F16D 1/12* (2013.01); *F01L 2001/3522* (2013.01); *F01L 2009/0411* (2013.01)

(58) Field of Classification Search
CPC ..... F01L 9/04; F01L 1/344; F01L 2001/3522; F01L 2009/0411; F16D 1/12
See application file for complete search history.

(56) References Cited

U.S. PATENT DOCUMENTS

| | | | |
|---|---|---|---|
| 6,216,654 B1 * | 4/2001 | Regueiro | F01L 1/34 123/90.15 |
| 6,328,006 B1 | 12/2001 | Heer | |
| 2008/0163836 A1 | 7/2008 | Taye et al. | |

* cited by examiner

*Primary Examiner* — Zelalem Eshete

(57) ABSTRACT

An electric motor for an electric camshaft phaser, including: a housing; a nut fixed with respect to the housing and including a first plurality of threads; a drive shaft including a second plurality of threads, a portion of which is meshed with the first plurality of threads, and including a first segment; a rotor rotationally fixed to the drive shaft, and radially surrounding the drive shaft; a stator radially surrounding the rotor, and arranged to be energized to rotate the rotor and the drive shaft; and a first blocking element. The drive shaft is rotatable with respect to the nut, and the first segment is arranged to connect to the electric camshaft phaser to rotate an output gear of the electric camshaft phaser. A rotation of the drive shaft, in a first circumferential direction, is blocked by a contact of the first blocking element with the nut.

20 Claims, 9 Drawing Sheets

ELECTRIC MOTOR, FOR AN ELECTRIC CAMSHAFT PHASER ASSEMBLY, INCLUDING END STOP FUNCTIONALITY AND METHOD THEREOF

TECHNICAL FIELD

The present disclosure relates to an electric motor for an electric camshaft phaser with end stop functionality for limiting a range of authority of the electric camshaft phaser. In particular, the electric motor includes features for limiting rotation of a drive shaft of the electric motor. The present disclosure also relates to an electric camshaft phaser assembly including the electric motor and a method of operating the electric camshaft phaser assembly.

BACKGROUND

A known electric camshaft phaser assembly includes an end stop connected to an output gear of the electric camshaft phaser. The end stop is separately fabricated, for example made of compacted powder metal and multiple steps are required for adding the end stop to the output gear. Additional steps, such as stamping and deburring, are needed to prepare the output gear for installation of the end stop.

SUMMARY

According to aspects illustrated herein, there is provided an electric motor for an electric camshaft phaser, including: a housing; a nut fixed with respect to the housing and including a first plurality of threads; a drive shaft including a second plurality of threads, a portion of which is meshed with the first plurality of threads, and including a first segment; a rotor rotationally fixed to the drive shaft, and radially surrounding the drive shaft; a stator radially surrounding the rotor, and arranged to be energized to rotate the rotor and the drive shaft; and, a first blocking element. The drive shaft is rotatable with respect to the nut, and the first segment is arranged to connect to the electric camshaft phaser to rotate an output gear of the electric camshaft phaser. A rotation of the drive shaft, in a first circumferential direction, is blocked by a contact of the first blocking element with the nut.

According to aspects illustrated herein, there is provided an electric camshaft phaser assembly, including an electric camshaft phaser and an electric motor. The Electric camshaft phaser includes: an input gear arranged to receive a rotational torque; an output gear arranged to non-rotatably connect to a camshaft; and a phasing assembly engaged with the input gear and the output gear and including an input component. The electric motor includes: a housing; a nut fixed with respect to the housing and including a first plurality of threads; a drive shaft including a second plurality of threads, at least a portion of which is meshed with the first plurality of threads, and including a segment non-rotatably connected to the input component of the phasing assembly; a rotor disposed within the housing, rotationally fixed to the drive shaft, and radially surrounding the drive shaft; a stator disposed within the housing, radially surrounding the rotor of the electric motor, and arranged to be energized to rotate the rotor; and a first blocking element. The drive shaft is arranged to rotate the input component of the phasing assembly, and the input component is arranged to rotate the output gear with respect to the input gear. A displacement of the drive shaft, in a first axial direction, is blocked by a contact of the first blocking element with the nut. A displacement of the drive shaft in a first circumferential direction is blocked by the contact of the first blocking element with the nut.

According to aspects illustrated herein, there is provided a method of operating an electric camshaft phaser assembly, including: receiving, with an input gear of a camshaft phaser, a rotational torque; rotating, with the rotational torque, an output gear of a camshaft; energizing a stator of an electric motor; rotating, using the stator, a rotor of the electric motor in a first circumferential direction; rotating, in the first circumferential direction, a drive shaft of the electric motor non-rotatably connected to the rotor and including a first plurality of threads, at least a portion of which is meshed with a second plurality of threads of a nut fixed with respect to a housing of the electric motor; rotating, with the drive shaft, an input component of the camshaft phaser in the first circumferential direction, the input component engaged with the input gear and with the output gear of the camshaft phaser; rotating, using the input component, the output gear with respect to the input gear in one of the first circumferential direction or a second circumferential direction opposite the first circumferential direction; contacting the nut with a first blocking element of the electric motor axially fixed to the drive shaft; blocking, with the first blocking element, further rotation of the drive shaft in the first circumferential direction; and curtailing further rotation of the output gear with respect to the input gear in the one of the first circumferential direction or the second circumferential direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
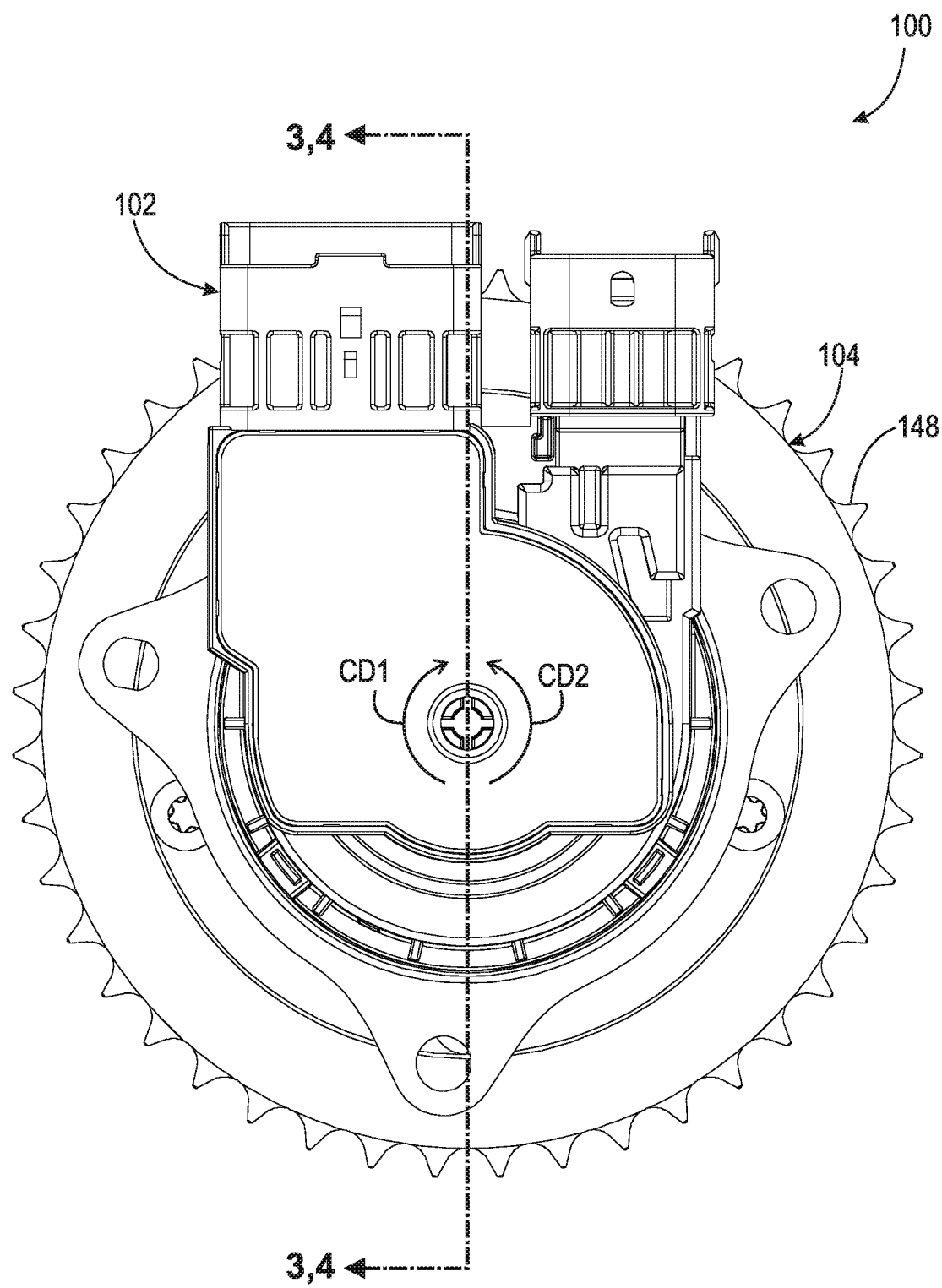
FIG. 1 is a front view of a phaser assembly.

FIG. 1 is a front view of electric camshaft phaser assembly 100.

Figure 2:
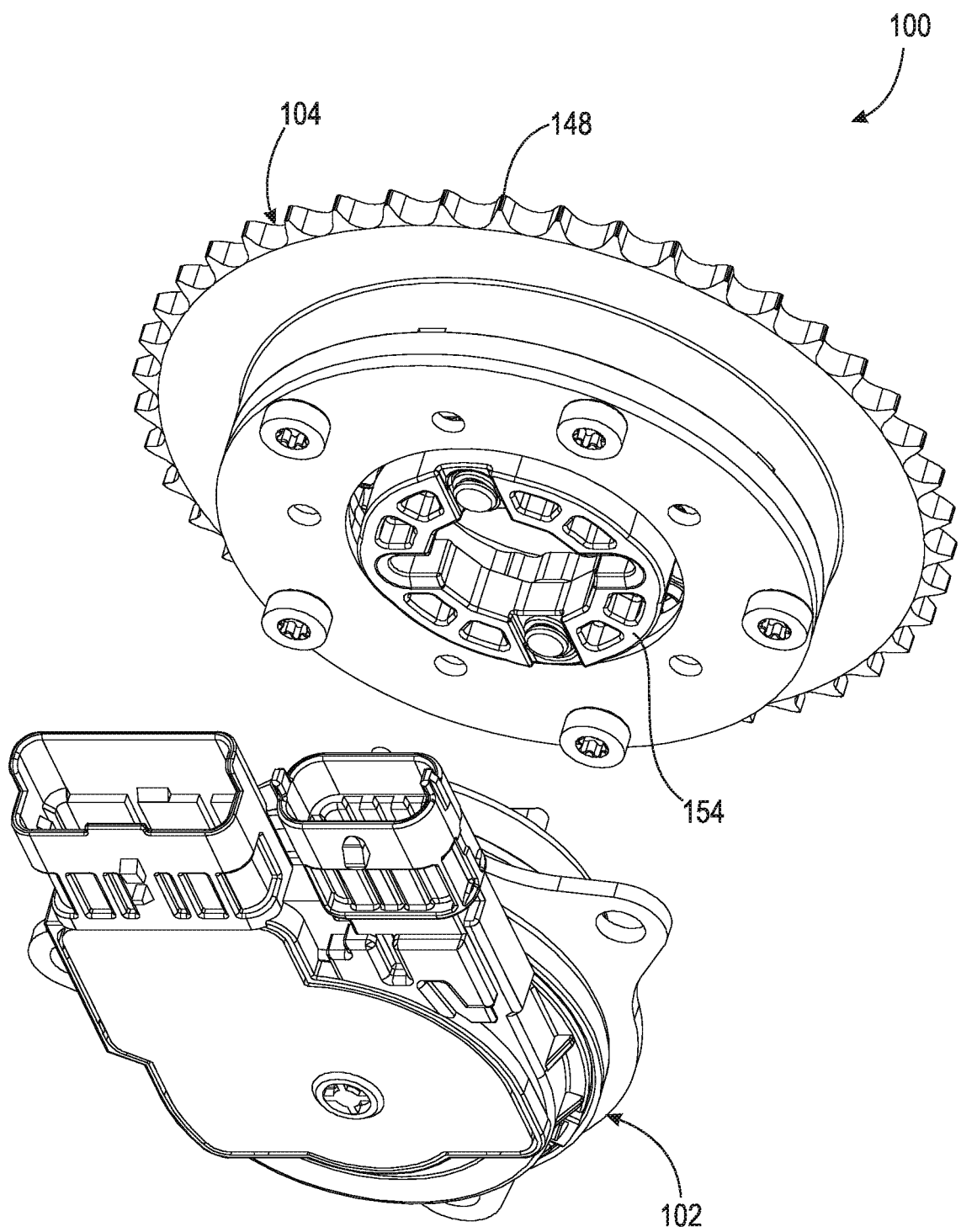
FIG. 2 is a partial exploded view of the phaser assembly shown in FIG. 1.

FIG. 2 is a partial exploded view of electric camshaft phaser assembly 100 shown in FIG. 1.

Figure 3:
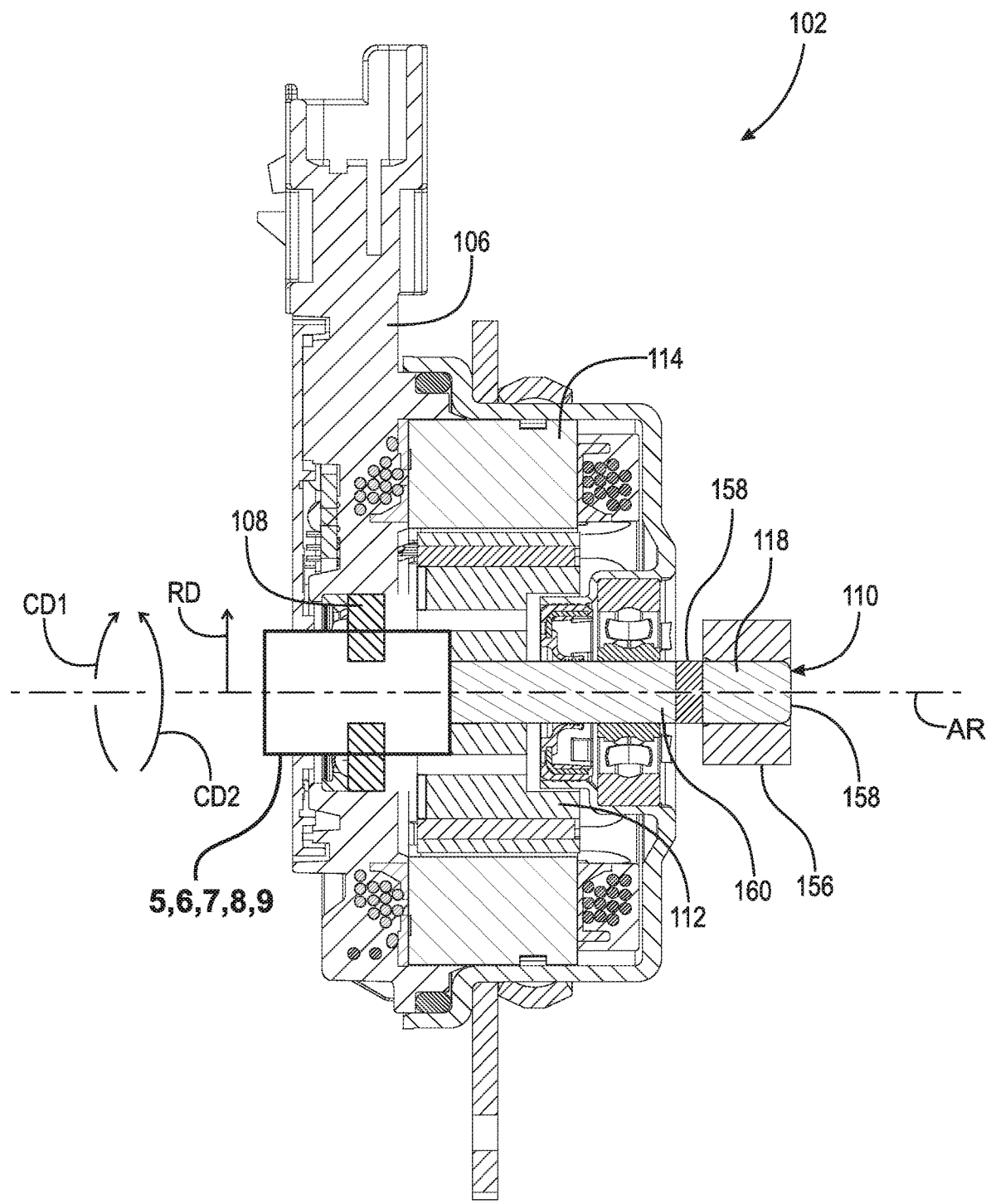
FIG. 3 is a cross-sectional view generally along line 3,4-3,4 in FIG. 1.

FIG. 3 is a cross-sectional view generally along line 3,4-3,4 in FIG. 1.

Figure 4:
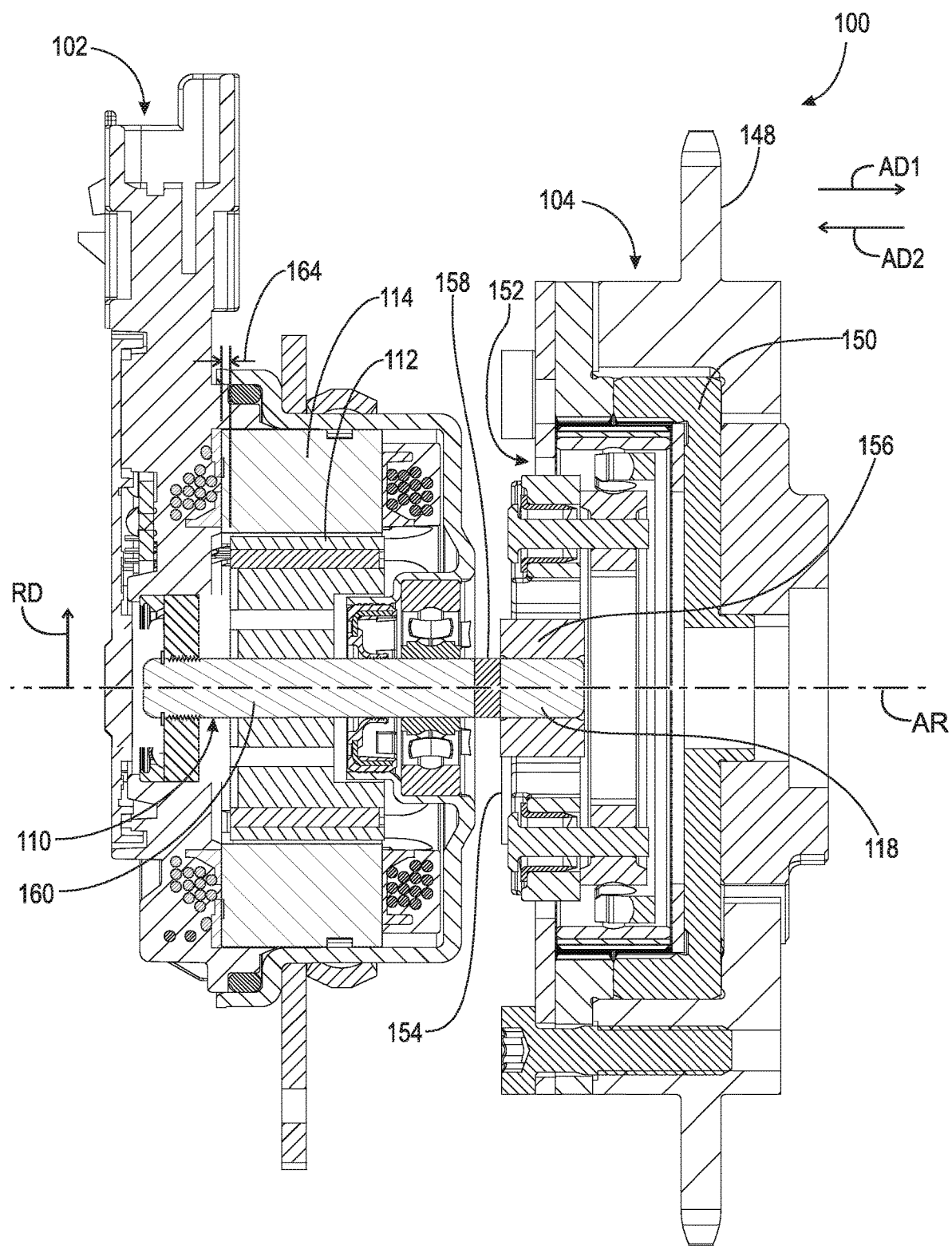
FIG. 4 is a cross-sectional view generally along line 3,4-3,4 in FIG. 1.

FIG. 4 is a cross-sectional view generally along line 3,4-3,4 in FIG. 1. The following should be viewed in light of FIGS. 1 through 4. Phaser assembly 100 includes electric motor 102 and electric camshaft phaser 104. Electric motor 102 includes: housing 106; nut 108 located within housing 106 and fixed with respect to housing 106; drive shaft 110; rotor 112; and stator 114. Drive shaft 110 extends beyond housing 106 in axial direction AD1. Drive shaft 110 is rotatable with respect to nut 108 and is axially displaceable with respect to nut 108. Nut 108, rotor 112 and stator 114 are disposed within housing 106. Drive shaft 110 is rotationally fixed, or non-rotatably connected, to rotor 112, and rotor 112 radially surrounds a portion of drive shaft 110. Stator 114 radially surrounds rotor 112. As is known in the art, stator 114 is arranged to be electrically energized to: rotate rotor 112 and drive shaft 110 about axis of rotation AR of motor 102 in opposite circumferential directions CD1 and CD2; and rotate drive shaft 110 with respect to nut 108 in circumferential directions CD1 and CD2.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

Figure 5:
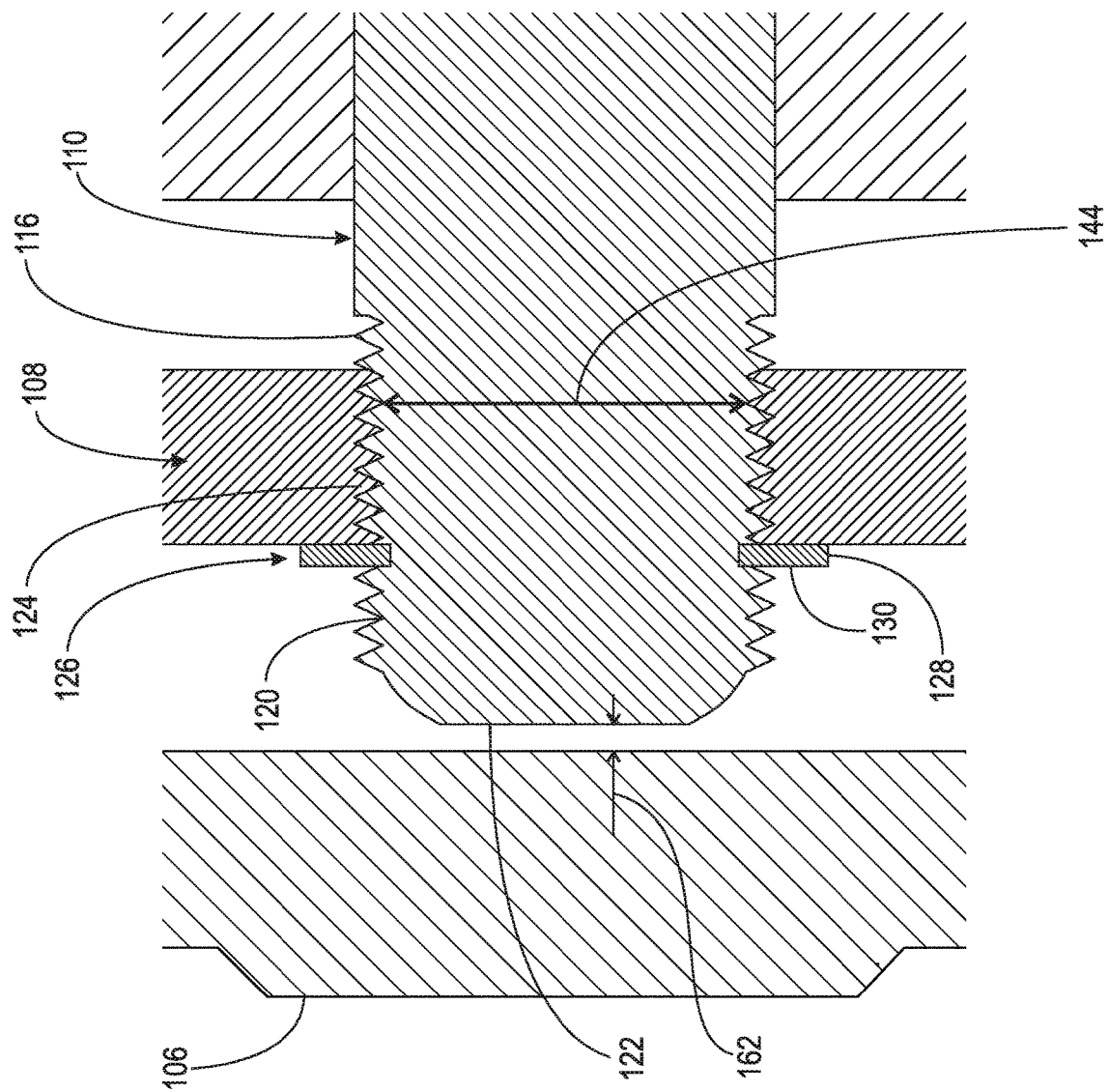
FIG. 5 is a detail of area 5,6,7,8,9 in FIG. 4.

FIG. 5 is a detail of area 5,6,7,8,9 in FIG. 3. Area 5,6,7,8,9 in FIG. 3 is intentionally left blank. FIGS. 5,6,7,8,9 show different structures and/or configurations of components within area 5,6,7,8,9. Drive shaft 110 includes: threads 116; segment 118; and segment 120 extending past nut 108 in axial direction AD2, opposite direction AD1, and including distal end 122 of drive shaft 110. Nut 108 includes threads 124. At least a portion of threads 116 are meshed with threads 124. The size and shape of threads 116 and 124 are exaggerated or otherwise schematically altered in the Figures to clarify presentation.

The discussion that follows assumes: rotation of rotor 112 and drive shaft 110 in direction CD1 displaces drive shaft 110, with respect to housing 106 and nut 108, in axial direction AD1; and rotation of rotor 112 and drive shaft 110 in direction CD2 displaces drive shaft 110, with respect to housing 106 and nut 108, in axial direction AD2. It should be understood that the relationship between circumferential direction and axial direction can be reversed, for example: in an alternate configuration of threads 116 and 124, rotation of rotor 112 and drive shaft 110 in direction CD1 displaces drive shaft 110, with respect to housing 106 and nut 108, in axial direction AD2; and rotation of rotor 112 and drive shaft 110 in direction CD2 displaces drive shaft 110, with respect to housing 106 and nut 108, in axial direction AD1.

Motor 102 includes blocking element 126 extending radially outwardly from drive shaft 110. An axial position of blocking element 126, with respect to drive shaft 110, is fixed. Blocking element 126 is arranged to limit: rotation of drive shaft 110 in direction CD1; and displacement of drive shaft 110 in direction AD1. As further described below, blocking element 126 contacts nut 108 to block, rotation of drive shaft 110 in direction CD1 and displacement of drive shaft 110 in direction AD1. In the example of FIG. 5: blocking element 126 includes snap ring 128 radially disposed about segment 120 in slot 130; and rotor 112 and drive shaft 110 have been rotated in direction CD1, by stator 114, such that contact of snap ring 128 with nut 108 blocks rotation of drive shaft 110 in direction CD1 and displacement of drive shaft 110 in direction AD1

Figure 6:
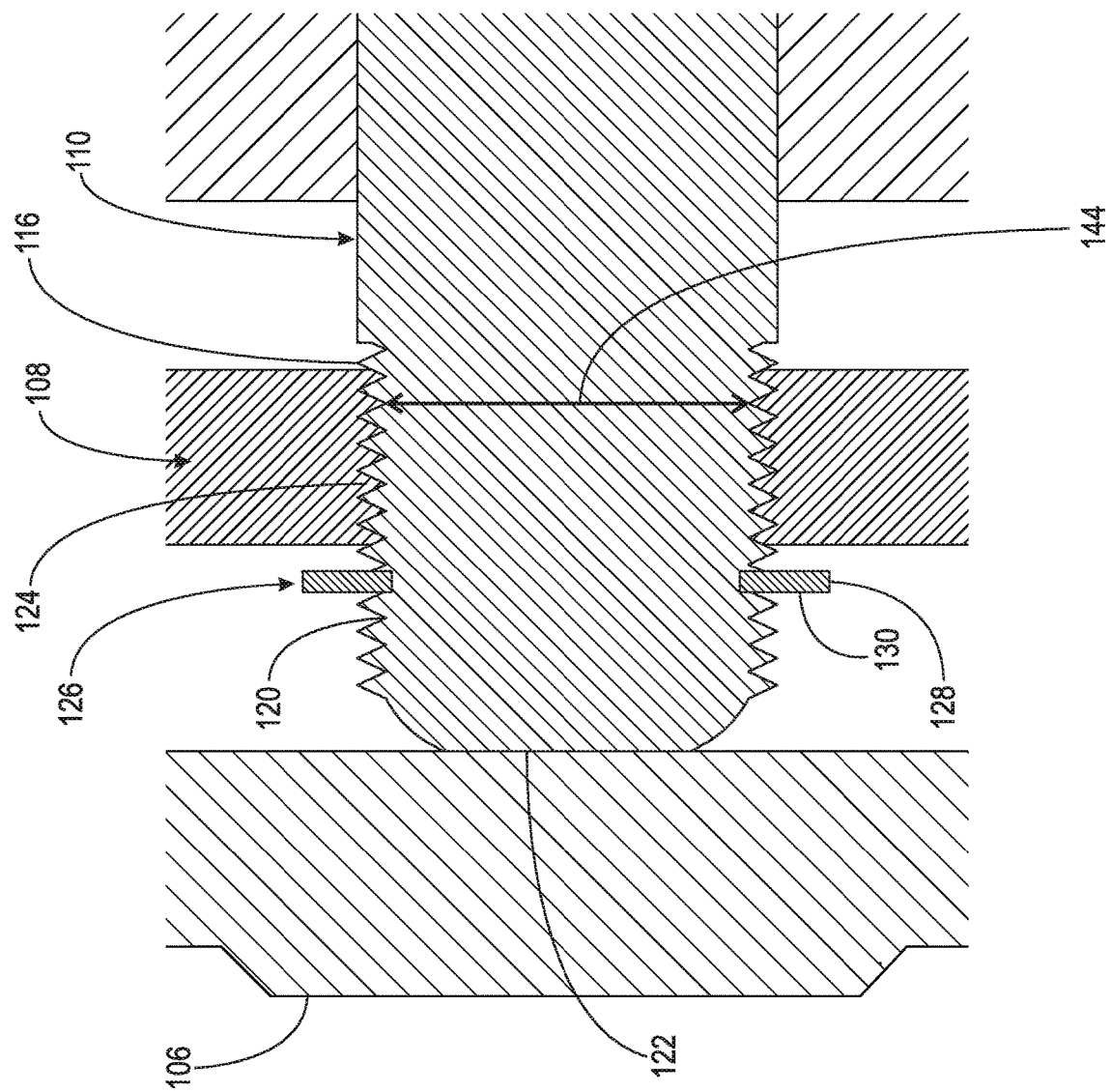
FIG. 6 is a detail of area 5,6,7,8,9 in FIG. 4.

FIG. 6 is a detail of area 5,6,7,8,9 in FIG. 3. In FIG. 6, rotor 112 and drive shaft 110 have been rotated in direction CD2 and drive shaft 110 have been displaced in axial AD2, with respect to nut 108, such that distal end 122 of drive shaft 110 is in contact with housing 106. The contact of end 122 with housing 106 blocks: further rotation of drive shaft 110, with respect to nut 108, in direction CD2; and further displacement of shaft 110 in direction AD2.

Figure 7:
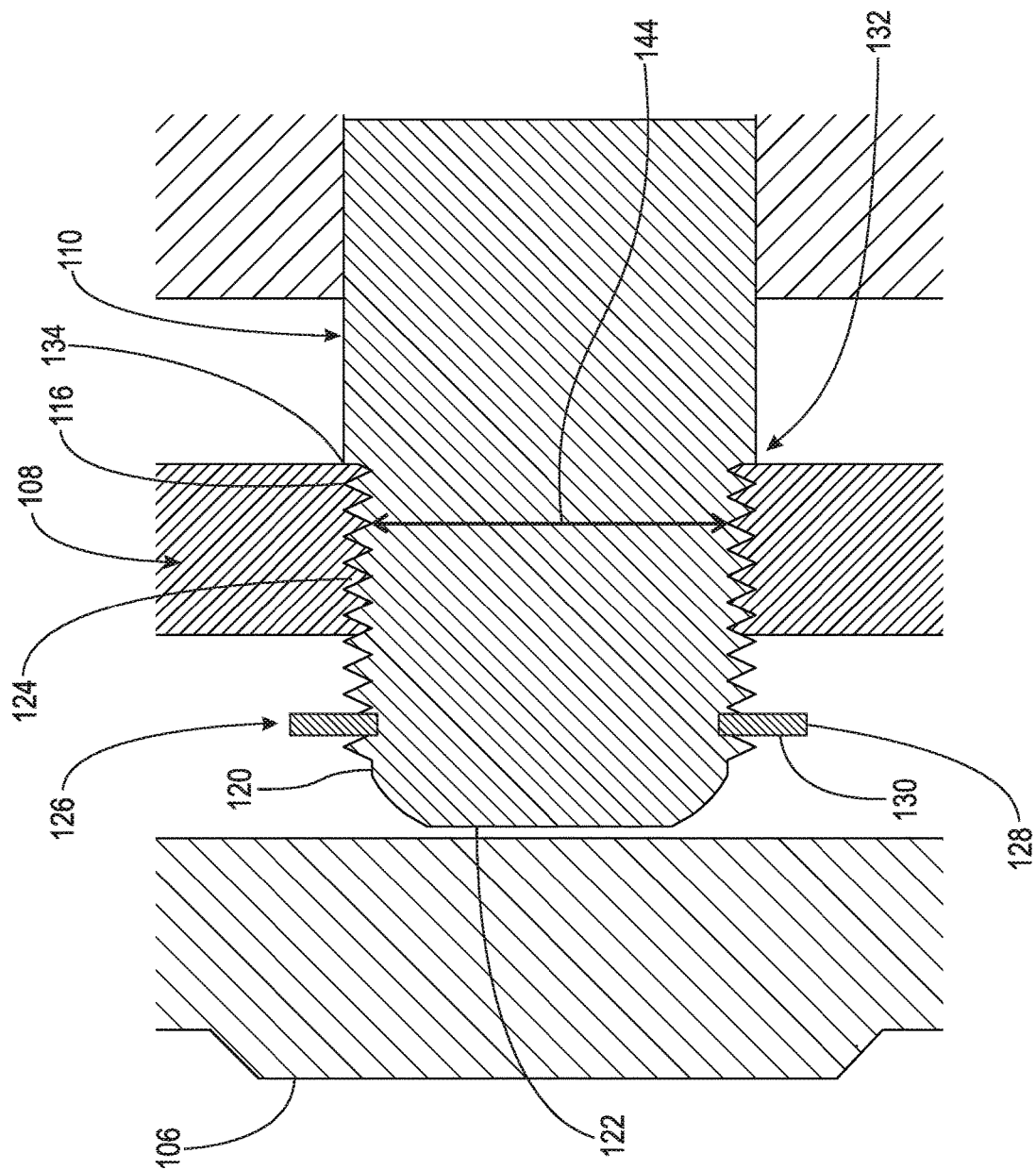
FIG. 7 is a detail of area 5,6,7,8,9 in FIG. 4.

FIG. 7 is a detail of area 5,6,7,8,9 in FIG. 3. In FIG. 7, as in FIG. 5, rotation of drive shaft 110 in direction CD1 is blocked by contact of blocking element 126 with nut 108. In an example embodiment, motor 102 includes blocking element 132 arranged to limit rotation of drive shaft 110 in direction CD2 and displacement of drive shaft 110 in direction AD2. Threads 116 include terminal end 134. In an example embodiment, blocking element 132 includes end 134. Thus, as seen in FIG. 7, contact of threads 124 with end 134 blocks rotation of drive shaft 110 in direction CD2 and displacement of drive shaft 110 in direction AD2.

Figure 8:
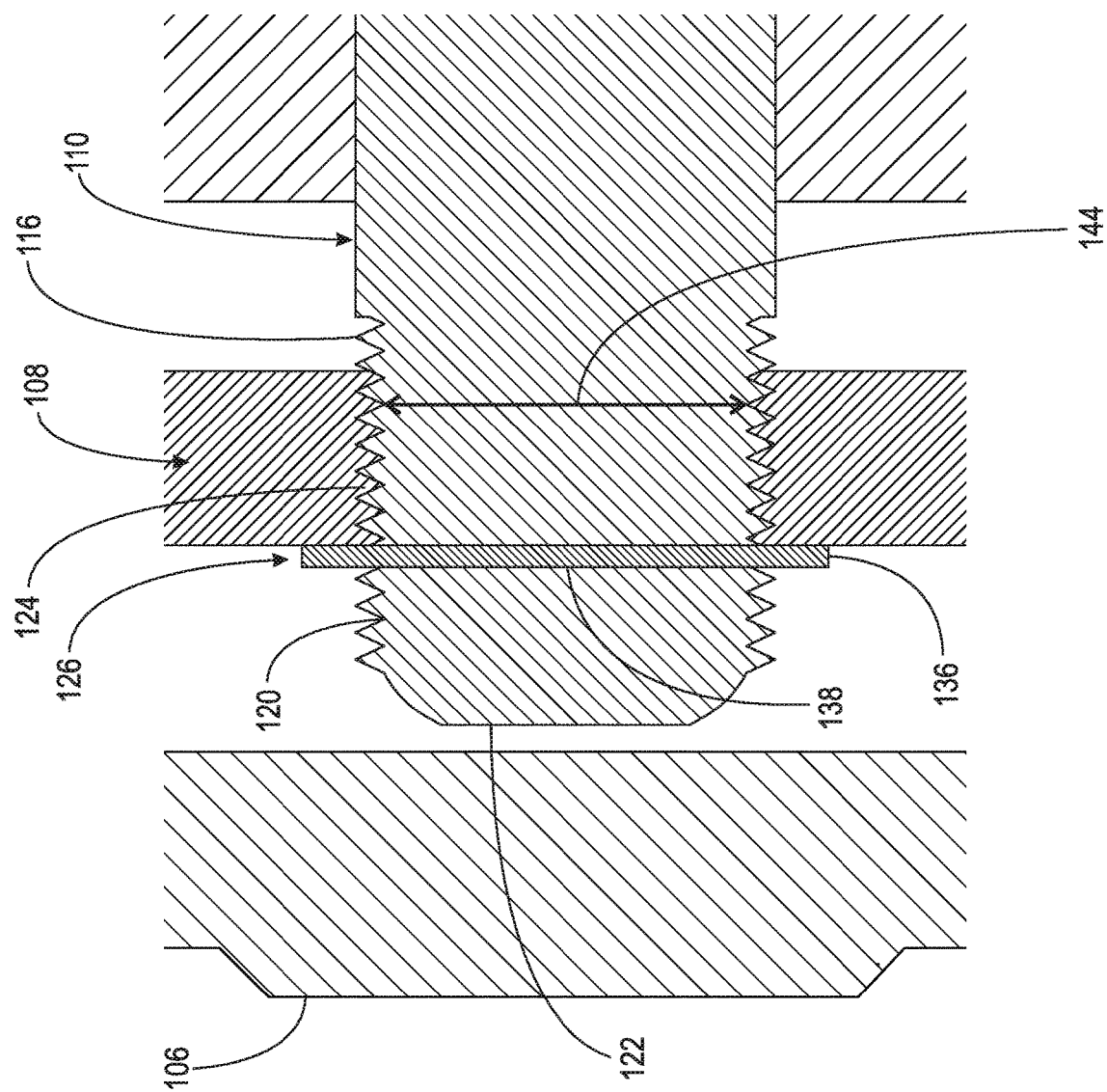
FIG. 8 is a detail of area 5,6,7,8,9 in FIG. 4.

FIG. 8 is a detail of area 5,6,7,8,9 in FIG. 3. In FIG. 8, blocking element 126 includes 136 pin passing through through-bore 138 in drive shaft 110 and extending radially beyond segment 120. Contact of pin 136 with nut 108 blocks rotation of drive shaft 110 in direction CD1. The discussions for FIGS. 6 and 7 regarding the limiting of the rotation of drive shaft 110 in direction CD2 are applicable to FIG. 8.

Figure 9:
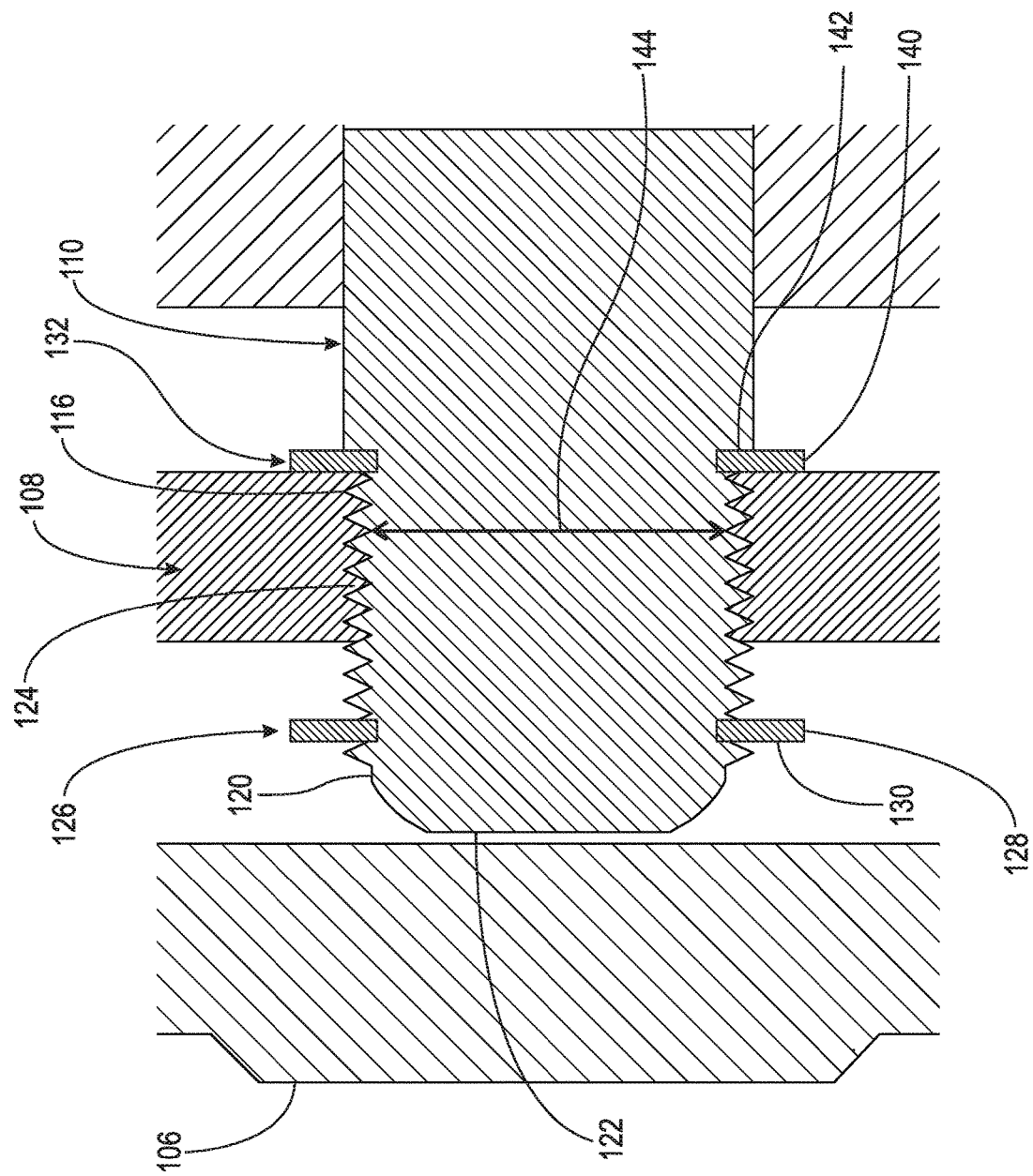
FIG. 9 is a detail of area 5,6,7,8,9 in FIG. 4.

FIG. 9 is a detail of area 5,6,7,8,9 in FIG. 3. In FIG. 9, blocking element 132 includes snap ring 140 in slot 142 of drive shaft 110 and radially disposed about drive shaft 110. Contact of snap ring 140 with nut 108 blocks: rotation of drive shaft 110 in direction CD2; and displacement of drive shaft 110 in direction AD2. In the example of FIG. 9, rotor 112 and drive shaft 110 have been rotated in direction CD2, by stator 114, such that snap ring 140 is in contact with nut 108.

In an example embodiment (not shown), threads 116 do not extend as far in direction AD2 an outside diameter of segment 120 is less than inside diameter 144 of threads 124. Thus, segment 120 can be passed through nut 108 in direction AD2, without engaging threads 124, to install shaft 110 in nut 108 and to mesh threads 116 and 124.

The construction and operation of electric camshaft phaser 104 is known in the art. Electric phaser 104 includes input gear 148 arranged to receive rotational torque, output gear 150 arranged to non-rotatably connect to a camshaft (not shown), and phasing assembly 152 engaged with input gear 148 and output gear 150 and including input component 154. Motor 102 includes paddle 156 fixedly connected to segment 118 of drive shaft 110. Paddle 156 is non-rotatably connected to input component 154. In the example of FIG. 1, assembly 152 includes a harmonic drive.

The torque received by input gear 148 is transmitted to output gear 150; and electric motor 102, in particular drive shaft 110 and paddle 156, is used to rotate input component 154 to rotate output gear 150 with respect to input gear 148 to control phasing of the camshaft connected to phaser 104. As noted above, a range of authority of phaser 104 is needed to limit the degree to which output gear 150 can be rotated with respect to input gear 148 in directions CD1 and CD2.

The range of authority in phaser assembly 100 is established in a novel fashion by the interaction of a combination of components including housing 106, nut 108, drive shaft 110, blocking element 126, and blocking element 132. For example: beginning from contact of blocking element 126 with nut 108, a predetermined number of complete rotations of drive shaft 110 about axis AR in direction CD2 causes: end 122 to contact housing 106 or causes blocking element 132 to contact nut 108. For example: beginning from contact of blocking element 132 with nut 108 or contact of end 122 with housing 106, a predetermined number of complete rotations of drive shaft 110 about axis AR in direction CD1 causes element 126 to contact nut 108.

Thus for example: contact of blocking element 126 with nut 108 establishes the maximum rotation of output gear 150 with respect to input gear 148 in direction CD1; and the maximum rotation of output gear 150 with respect to input gear 148 in direction CD2 is established by contact of end 122 with housing 106 or by contact of element 132 with nut 108.

To prevent axial displacement of paddle 156 within input component 154, coupling 158 is installed between segment 160 of drive shaft 110 and segment 118 of drive shaft 110, to which paddle 156 is connected. Coupling 158 transmits rotational torque from segment 160 to segment 118 and absorbs axial displacement of segment 160. Thus, coupling 158 isolates segment 118 and paddle 156 from axial displacement due to rotation of shaft 110 within nut 108. Any suitable coupling known in the art, including but not limited to an Oldham coupling, can be used for coupling 158.

Rotor 112 and stator 114 are configured such that under all operating conditions, an entirety of rotor 112 is sequentially aligned in radially outer direction RD with stator 114. Stated otherwise, under all operating conditions, an entirety of rotor 112 is radially disposed between stator 114 and axis of rotation AR. In an example embodiment, rotor 112 axially displaces with shaft 110 and an entirety of rotor 112 remains radially disposed between axis of rotation AR and stator 114. Stated otherwise, the entirety of the rotor is sequentially aligned, in radially outer direction RD, with stator 114. For example, in FIG. 4: blocking element 126 is in contact with nut 108 and shaft 110 and rotor 112 are displaced to a maximum extent in direction AD1 with respect to stator 114 (configuration shown in FIG. 5); and the entirety of rotor 112 is sequentially aligned, in radially outer direction RD, with stator 114. For example: in FIGS. 4 and 5, end 122 is separated from housing 106 by gap 162 in direction AD2; and in FIGS. 4 and 5, stator 114 extends past rotor 112 by distance 164 in direction AD1. Distance 164 is greater or equal to gap 162. Therefore, when shaft 110 and rotor 112 are displaced to the maximum extent in direction AD2, as shown in FIG. 6, no portion of rotor 112 extends past stator 114 in direction AD2, and the entirety of rotor 112 is sequentially aligned, in radially outer direction RD, with stator 114.

The total number of rotations of drive shaft 110 to transition from maximum rotation of output gear 150 with respect to input gear 148 in direction CD1 to maximum rotation of output gear 150 with respect to input gear 148 in direction CD2 is selected according to the requirements of electric phaser 104. Given the selected total number of rotations, the pitch of threads 116 and 124 are selected according to other design parameters, for example, minimizing axial displacement of drive shaft 110. Given the amount of axial displacement associated with the selected thread pitches: the axial positioning of blocking element 126, with respect to shaft 110, is determined for limiting rotation of drive shaft 110 in direction CD1 to the desired degree; and to limit the rotation of drive shaft 110 in direction CD2 to the desired degree, the axial positioning of drive shaft 110 with respect to housing 106 is selected, or the axial positioning of blocking element 132 with respect to shaft 110 is selected.

In an example embodiment, motor 102 includes a means (not shown) of preventing overloading and overheating of motor 102 when rotation of drive shaft 110 is blocked at either end of the range of motion of drive shaft 110 (for example, by contact of drive shaft 110 with housing 106, or by contact of snap ring 128 with nut 108). For example, the means of preventing overload and overheating includes a means of measuring current to stator 114 and a means of switching off current, for example a transistor switch, to stator 114 when a current level, associated with the rotation of drive shaft 110 being blocked at either end of the range of motion of drive shaft 110, is detected. Any means known in the art can be used to prevent overloading and overheating of motor 102 when rotation of drive shaft 110 is blocked at either end of the range of motion of drive shaft 110.

In an example embodiment (not shown), motor 102 includes a means of lubricating nut 108 and drive shaft 110.

The following should be viewed in light of FIGS. 1 through 9. The following describes a method of operating an electric camshaft phaser assembly. A first step receives, with an input gear of a camshaft phaser, a rotational torque. A second step rotates, with the rotational torque, an output gear of a camshaft. A third step energizes a stator of an electric motor. A fourth step rotates, using the stator, a rotor of the electric motor in a first circumferential direction. A fifth step rotates, in the first circumferential direction, a drive shaft of the electric motor non-rotatably connected to the rotor and including a first plurality of threads, at least a portion of which is meshed with a second plurality of threads of a nut fixed with respect to a housing of the electric motor. A sixth step rotates, with the drive shaft, an input component of the camshaft phaser in the first circumferential direction, the input component engaged with the input gear and with the output gear of the camshaft phaser. A seventh step rotates, using the input component, the output gear with respect to the input gear in one of the first circumferential direction or a second circumferential direction opposite the first circumferential direction. An eighth step contacts the nut with a first blocking element of the electric motor axially fixed to the drive shaft. A ninth step blocks, with the first blocking element, further rotation of the drive shaft in the first circumferential direction. A tenth step curtails further rotation of the output gear with respect to the input gear in the one of the first circumferential direction or the second circumferential direction.

Rotating, in the first circumferential direction, the drive shaft includes displacing the drive shaft in an axial direction. Then, an eleventh step blocks, with the first blocking element, further displacement of the drive shaft in the axial direction.

In an example embodiment: a twelfth step rotates, using the stator, the rotor and the drive shaft in the second circumferential direction; a thirteenth step rotates, with the drive shaft, the input component of the camshaft phaser in the second circumferential direction and displacing the drive shaft in a second axial direction, opposite the first axial direction; a fourteenth step rotates, using the input component, the output gear with respect to the input gear in the other of the first circumferential direction or the second circumferential direction; a fifteenth step contacts the nut with a second blocking element of the electric motor axially fixed to the drive shaft; a sixteenth step blocks, with the second blocking element, further rotation of the drive shaft in the second circumferential direction and further displacement of the drive shaft in the second axial direction; a seventeenth step curtails further rotation of the output gear with respect to the input gear in the other of the first circumferential direction or the second circumferential direction; an eighteenth step limits, using the electric motor, an extent of the rotation of the output gear with respect to the input gear in the first circumferential direction; and a nineteenth step limits, using the electric motor, an extent of the rotation of the output gear with respect to the input gear in the second circumferential direction.

In an example embodiment: a twelfth step rotates, using the energized stator, the rotor and the drive shaft in the second circumferential direction; a thirteenth step rotates, with the drive shaft, the input component of the camshaft phaser in the second circumferential direction and displacing the drive shaft in a second axial direction, opposite the first axial direction; a fifteenth step rotates, using the input component, the output gear with respect to the input gear in the other of the first circumferential direction or the second circumferential direction; a sixteenth step contacts the housing with the drive shaft; a seventeenth step blocks, with the housing, further rotation of the drive shaft in the second circumferential direction and further displacement of the drive shaft in the second axial direction; an eighteenth step curtails further rotation of the output gear with respect to the input gear in the other of the first circumferential direction or the second circumferential direction; a nineteenth step limits, using the electric motor, an extent of the rotation of the output gear with respect to the input gear in the first circumferential direction; and a twentieth step limits, using the electric motor, an extent of the rotation of the output gear with respect to the input gear in the second circumferential direction.

Electric motor 102 eliminates the need for an end stop, described above, connected to an output gear of an electric camshaft phaser. As noted above in the examples above: contact of blocking element 126 with nut 108 establishes the maximum rotation of output gear 150 with respect to input gear 148 in direction CD1; and the maximum rotation of output gear 150 with respect to input gear 148 in direction CD2 is established by contact of end 122 with housing 106 or by contact of element 132 with nut 108. The configuration of electric motor 102 is simpler and more cost-effective than a prior art end stop described above. Further, additional machining of an output gear to accommodate the prior art end stop is eliminated. As a result, the cost and complexity of assembly 100 is reduced.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
RD radial direction
100 camshaft phaser assembly
102 electric motor
104 electric camshaft phaser
106 housing, motor
108 nut
110 drive shaft, motor
112 rotor, motor
114 stator, motor
116 thread, drive shaft
118 segment, drive shaft
120 segment, drive shaft
122 distal end, drive shaft
124 threads, nut
126 blocking element
128 snap ring
130 slot, drive shaft
132 blocking element
134 terminal end, threads 116
136 pin, drive shaft
138 through-bore, drive shaft
140 snap ring
142 slot, drive shaft
144 inside diameter, threads 124
148 input gear, phaser
150 output gear, phaser
152 phasing assembly
154 input component
156 paddle
158 coupling
160 segment, drive shaft
162 gap
164 distance

The invention claimed is:

1. An electric motor for an electric camshaft phaser, comprising:
   a housing;
   a nut fixed with respect to the housing and including a first plurality of threads;
   a drive shaft including a second plurality of threads, a portion of which is meshed with the first plurality of threads, and including a first segment;
   a rotor rotationally fixed to the drive shaft, and radially surrounding the drive shaft;
   a stator radially surrounding the rotor, and arranged to be energized to rotate the rotor and the drive shaft; and,
   a first blocking element, wherein:
      the drive shaft is rotatable with respect to the nut, and the first segment is arranged to connect to the electric camshaft phaser to rotate an output gear of the electric camshaft phaser; and,
      a rotation of the drive shaft, in a first circumferential direction, is blocked by a contact of the first blocking element with the nut.

2. The electric motor of claim 1, wherein:
   the stator is arranged to rotate the drive shaft in the first circumferential direction to axially displace the drive shaft in a first axial direction; and, displacement of the drive shaft in the first axial direction is blocked by the contact of the first blocking element with the nut.

3. The electric motor of claim 2, wherein the drive shaft includes a second segment extending past the nut in a second axial direction, opposite the first axial direction; and wherein the first blocking element extends radially outwardly from the second segment.

4. The electric motor of claim 1, wherein an axial position of the first blocking element, with respect to the drive shaft, is fixed.

5. The electric motor of claim 1, wherein:
the first blocking element includes a snap ring radially disposed about the drive shaft; or,
the first blocking element includes a pin passing through the drive shaft.

6. The electric motor of claim 1, further comprising:
a stator and a rotor non-rotatably connected to the drive shaft, wherein:
the stator, the rotor and the nut are located within the housing; and,
when the first blocking element is in contact with the nut, an entirety of the rotor is sequentially aligned, in a radially outer direction, with the stator.

7. The electric motor of claim 1, further comprising:
a second blocking element, wherein a rotation of the drive shaft, in a second circumferential direction, opposite the first circumferential direction, is blocked by a contact of the second blocking element with the nut.

8. The electric motor of claim 7, wherein:
the stator is arranged to rotate the drive shaft in the second circumferential direction to axially displace the drive shaft in an axial direction; and,
displacement of the drive shaft in the axial direction is blocked by the contact of the second blocking element with the nut.

9. The electric motor of claim 7, further comprising:
a stator and a rotor non-rotatably connected to the drive shaft, wherein the stator, the rotor and the nut are located within the housing; and wherein when the second blocking element is in contact with the nut, an entirety of the rotor is sequentially aligned, in a radially outer direction, with the stator.

10. The electric motor of claim 7, wherein:
an axial position of the second blocking element, with respect to the drive shaft, is fixed;
the second plurality of threads includes a terminal end; and,
the second blocking element includes a snap ring radially disposed about the drive shaft, or a pin passing through the drive shaft, or the terminal end of the first plurality of threads.

11. The electric motor of claim 1, wherein:
rotation of the drive shaft, in a second circumferential direction, opposite the first circumferential direction, is limited by contact of the drive shaft with the housing; and,
displacement of the drive shaft in an axial direction is limited by contact of the drive shaft with the housing.

12. The electric motor of claim 11, wherein when the drive shaft is in contact with the housing, an entirety of the rotor is sequentially aligned, in a radially outer direction, with the stator.

13. An electric camshaft phaser assembly, comprising:
an electric camshaft phaser including:
an input gear arranged to receive a rotational torque;
an output gear arranged to non-rotatably connect to a camshaft; and,
a phasing assembly engaged with the input gear and the output gear and including an input component; and,
an electric motor including:
a housing;
a nut fixed with respect to the housing and including a first plurality of threads;
a drive shaft including a second plurality of threads, at least a portion of which is meshed with the first plurality of threads, and including a segment non-rotatably connected to the input component of the phasing assembly;
a rotor disposed within the housing, rotationally fixed to the drive shaft, and radially surrounding the drive shaft;
a stator disposed within the housing, radially surrounding the rotor of the electric motor, and arranged to be energized to rotate the rotor; and,
a first blocking element, wherein:
the drive shaft is arranged to rotate the input component of the phasing assembly;
the input component is arranged to rotate the output gear with respect to the input gear;
displacement of the drive shaft, in a first axial direction, is blocked by a contact of the first blocking element with the nut; and,
a displacement of the drive shaft in a first circumferential direction is blocked by the contact of the first blocking element with the nut.

14. The electric motor of claim 13, further comprising:
a second blocking element, wherein:
rotation of the drive shaft, in a second circumferential direction, opposite the first circumferential direction, is blocked by a contact of the second blocking element with the nut; and,
a displacement of the drive shaft, in a second axial direction, opposite the first axial direction, is blocked by the contact of the second blocking element with the nut.

15. The electric motor of claim 13, wherein:
rotation of the drive shaft, in a second circumferential direction, opposite the first circumferential direction, is blocked by a contact of the drive shaft with the housing; and,
a displacement of the drive shaft, in a second axial direction, opposite the first axial direction, is blocked by the contact of the drive shaft with the housing.

16. A method of operating an electric camshaft phaser assembly, comprising:
receiving, with an input gear of a camshaft phaser, a rotational torque;
rotating, with the rotational torque, an output gear of the camshaft phaser;
energizing a stator of an electric motor;
rotating, using the stator, a rotor of the electric motor in a first circumferential direction;
rotating, in the first circumferential direction, a drive shaft of the electric motor non-rotatably connected to the rotor and including a first plurality of threads, at least a portion of which is meshed with a second plurality of threads of a nut fixed with respect to a housing of the electric motor;
rotating, with the drive shaft, an input component of the camshaft phaser in the first circumferential direction, the input component engaged with the input gear and with the output gear;

rotating, using the input component, the output gear with respect to the input gear in the first circumferential direction;

contacting the nut with a first blocking element of the electric motor axially fixed to the drive shaft;

blocking, with the first blocking element, further rotation of the drive shaft in the first circumferential direction; and, curtailing further rotation of the output gear with respect to the input gear in the first circumferential direction.

17. The method of claim 16, wherein rotating, in the first circumferential direction, the drive shaft includes displacing the drive shaft in a first axial direction, the method further comprising:

blocking, with the first blocking element, further displacement of the drive shaft in the first axial direction.

18. The method of claim 17, further comprising:

rotating, using the stator, the rotor and the drive shaft in a second circumferential direction, opposite the first circumferential direction;

rotating, with the drive shaft, the input component of the camshaft phaser in the second circumferential direction and displacing the drive shaft in a second axial direction, opposite the first axial direction;

rotating, using the input component, the output gear with respect to the input gear in the second circumferential direction;

contacting the nut with a second blocking element of the electric motor axially fixed to the drive shaft;

blocking, with the second blocking element, further rotation of the drive shaft in the second circumferential direction and further displacement of the drive shaft in the second axial direction; and, curtailing further rotation of the output gear with respect to the input gear in the second circumferential direction.

19. The method of claim 16, further comprising:

rotating, using the energized stator, the rotor and the drive shaft in a second circumferential direction, opposite the first circumferential direction;

rotating, with the drive shaft, the input component of the camshaft phaser in the second circumferential direction and displacing the drive shaft in an axial direction;

rotating, using the input component, the output gear with respect to the input gear in the second circumferential direction;

contacting the housing with the drive shaft;

blocking, with the housing, further rotation of the drive shaft in the second circumferential direction and further displacement of the drive shaft in the axial direction; and, curtailing further rotation of the output gear with respect to the input gear in the second circumferential direction.

20. The method of claim 18, further comprising:

limiting, using the electric motor, an extent of the rotation of the output gear with respect to the input gear in the first circumferential direction; and, limiting, using the electric motor, an extent of the rotation of the output gear with respect to the input gear in a second circumferential direction, opposite the first circumferential direction.

\* \* \* \* \*